United States Patent
Sundararajan et al.

(10) Patent No.: US 7,533,369 B2
(45) Date of Patent: May 12, 2009

(54) METHOD AND SYSTEM FOR PROVIDING DOCUMENTATION AND TRAINING IN A SOFTWARE DEVELOPMENT ACTIVITY

(75) Inventors: Parthasarathy Sundararajan, Tamil Nadu (IN); Krishnamoorthy Meenakshisundaram, Tamil Nadu (IN); Raghuram Devalla, Tamil Nadu (IN); Subramanian Seetharaman, Tamil Nadu (IN); Raman Srinivasan, Tamil Nadu (IN); Prema Subramaniam, Tamil Nadu (IN); Aparna Ramnath, Tamil Nadu (IN); Priyadarshini Sridhar, Tamil Nadu (IN)

(73) Assignee: Ramco Systems Limited, Chennai, Tamil Nadu (IN)

( * ) Notice: Subject to any disclaimer, the term of this patent is extended or adjusted under 35 U.S.C. 154(b) by 854 days.

(21) Appl. No.: 11/078,461

(22) Filed: Mar. 11, 2005

(65) Prior Publication Data

US 2005/0216891 A1    Sep. 29, 2005

Related U.S. Application Data

(60) Provisional application No. 60/553,470, filed on Mar. 16, 2004, provisional application No. 60/553,203, filed on Mar. 15, 2004.

(51) Int. Cl.
G06F 9/44 (2006.01)

(52) U.S. Cl. .................... 717/123; 717/106; 717/121

(58) Field of Classification Search .................. None
See application file for complete search history.

(56) References Cited

U.S. PATENT DOCUMENTS

| 6,212,677 | B1 | 4/2001 | Ohkubo et al. |
| 2002/0059348 | A1 | 5/2002 | Lee et al. |
| 2003/0083900 | A1 | 5/2003 | Khriss et al. |
| 2004/0010772 | A1* | 1/2004 | McKenna et al. ........... 717/101 |
| 2004/0117759 | A1* | 6/2004 | Rippert et al. ............. 717/100 |

FOREIGN PATENT DOCUMENTS

DE  19926370  12/2000

* cited by examiner

Primary Examiner—Chuck O Kendall
(74) Attorney, Agent, or Firm—Prakash Nama; Global IP Services, PLLC

(57) ABSTRACT

A system and method for generating software documentation and training material within a software development activity are described. The system includes a software coding module. a user interface module; and a testing module for providing an integrated testing environment within a software development system. The testing module includes an automated documentation generation module for generating documentation for an application and related software modules and an automated software training generation module for generating user training materials for an application and related software modules. The automated documentation generation module and the automated software training generation module utilize software specification structure defining the application and related software modules.

15 Claims, 6 Drawing Sheets

METHOD AND SYSTEM FOR PROVIDING DOCUMENTATION AND TRAINING IN A SOFTWARE DEVELOPMENT ACTIVITY

RELATED APPLICATIONS

Benefit is claimed under 35 U.S.C. 119(e) to U.S. Provisional Application Ser. No. 60/553,203, entitled "SOFTWARE STRUCTURE DRIVEN TRAINING AND DOCUMENTATION" by inventor Parthasarathy Sundararajan et al., filed Mar. 15, 2004, which is herein incorporated in its entirety by reference for all purposes.

Benefit is claimed under 35 U.S.C. 119(e) to U.S. Provisional Application Ser. No. 60/553,470, entitled "SCHEMA FOR STORING INTERGRATED SOFTWARE SPECIFICATION" by inventor Raghuram Devalla et al., filed Mar. 16, 2004, which is herein incorporated in its entirety by reference for all purposes.

FIELD OF THE INVENTION

Embodiments of the present invention relate generally to the technical field of software development and, in one example embodiment, to methods and systems for providing documentation and training in a software development activity within a software development system.

BACKGROUND

Creation of training material and documentation is a very visible and key activity in successfully executing software projects. Usually, the technical writers assigned to the development team hold the responsibility and are not necessarily functional or technical experts. The documentation team needs the knowledge briefing from the development team to create effective documentation. Documentation requirements may be classified into concept documentation, user documentation, technical documentation, and operational documentation.

Concept documentation deals with the overall flows in the systems delivered and present an approach to the theory behind the software operations. This is a very high level description of the operations built into the system. User documentation deals with the operations related to the various interfaces to the system and aids the user in day to day activities. Technical documentation deals with the way the system was created in terms of design and constructed pieces and the logic flow that binds the pieces along with the schema for internal data structures. Operational document relates to operating the application delivered in terms of deployment, access rights and location of repositories that need administration.

Each area of documentation and the associated training requires specific knowledge on these aspects of the system delivered. This knowledge is available with the respective teams inside a large project team. Constantly evolving nature of software development poses the problem of making available frozen specifications with which the documentation unit could carry on. Typical problems faced by documentation units are constantly changing software specification and behavior, lack of support to quickly incorporate changes that happen till the release stage, lack of clear handover point to start working on the documentation, and lack of support for maintaining the documentation up to date post implementation.

The two main issues that need to be addressed in creating effective training and documentation for large projects are knowledge creation scheme to aid the documentation and training units and change implementation approach that follows closely the structure with which the knowledge is created.

Complex software programs like Enterprise Resource Planning programs typically are of the size of several millions of lines of code. Even technical users find it difficult to understand the working of these complex programs. Additionally software is intangible and the way a user can "touch" the software system is often limited to the User Interface on the computer monitor. Thus, a primary problem faced by end users is the comprehension of the functionality and the inner workings of the software.

In the absence of such a working understanding of what a complex software system does and how it goes about doing what it does, a user is often unable to trust the output of the software program. This problem is traditionally solved by expensive and time consuming training activities conducted by highly skilled software developers and architects, and is supplemented by voluminous technical documentation. This traditional approach rests on the assumption that an understanding of software code can be transmitted through human contact and voluminous documentation.

SUMMARY

The below described embodiments of the present invention are directed to methods and systems to perform planning and testing for software modules within an automated development system. According to one embodiment, there is provided a system for generating software documentation and training materials within a software development activity. The system includes a software coding module. a user interface module; and a testing module for providing an integrated testing environment within a software development system. The testing module includes an automated documentation generation module for generating documentation for an application and related software modules and an automated software training generation module for generating user training materials for an application and related software modules. The automated documentation generation module and the automated software training generation module utilize software specification structure defining the application and related software modules.

In another embodiment, there is provided a method for generating software documentation and training materials within a software development activity, the method identifies process elements and various elements of software structure from an application and its related modules, describes user interfaces using requirements analysis after the completion of all user interface design processes, describes design elements for implementation of the application and related modules after the end of all module design has occurred; describes software artifacts and corresponding deployment map for the application and related modules during software module implementation; and generates documentation and training materials using the identified process elements, the user interfaces, the design elements, and the software artifacts.

In yet another embodiment, there is provided a machine-readable medium storing a set of instructions that, when executed by a machine, cause of the machine to perform a method for generating software documentation and training materials within a software development activity, the method identifies process elements and various elements of software structure from an application and its related modules, describes user interfaces using requirements analysis after the completion of all user interface design processes, describes design elements for implementation of the application and related modules after the end of all module design has occurred; describes software artifacts and corresponding deployment map for the application and related modules during software module implementation; and generates documentation and training materials using the identified process elements, the user interfaces, the design elements, and the software artifacts.

The details of one or more embodiments of the invention are set forth in the accompanying drawings and the description below. Other features, objects, and advantages of the invention will be apparent from the description and drawings, and from the claims.

DETAILED DESCRIPTION

A method and system for providing documentation and training in a software development activity within an automated development system are described. In the following description, for purposes of explanation, numerous specific details are set forth in order to provide a thorough understanding of the present invention. It will be evident, however, to one skilled in the art that the present invention may be practiced without these specific details.

Figure 1:
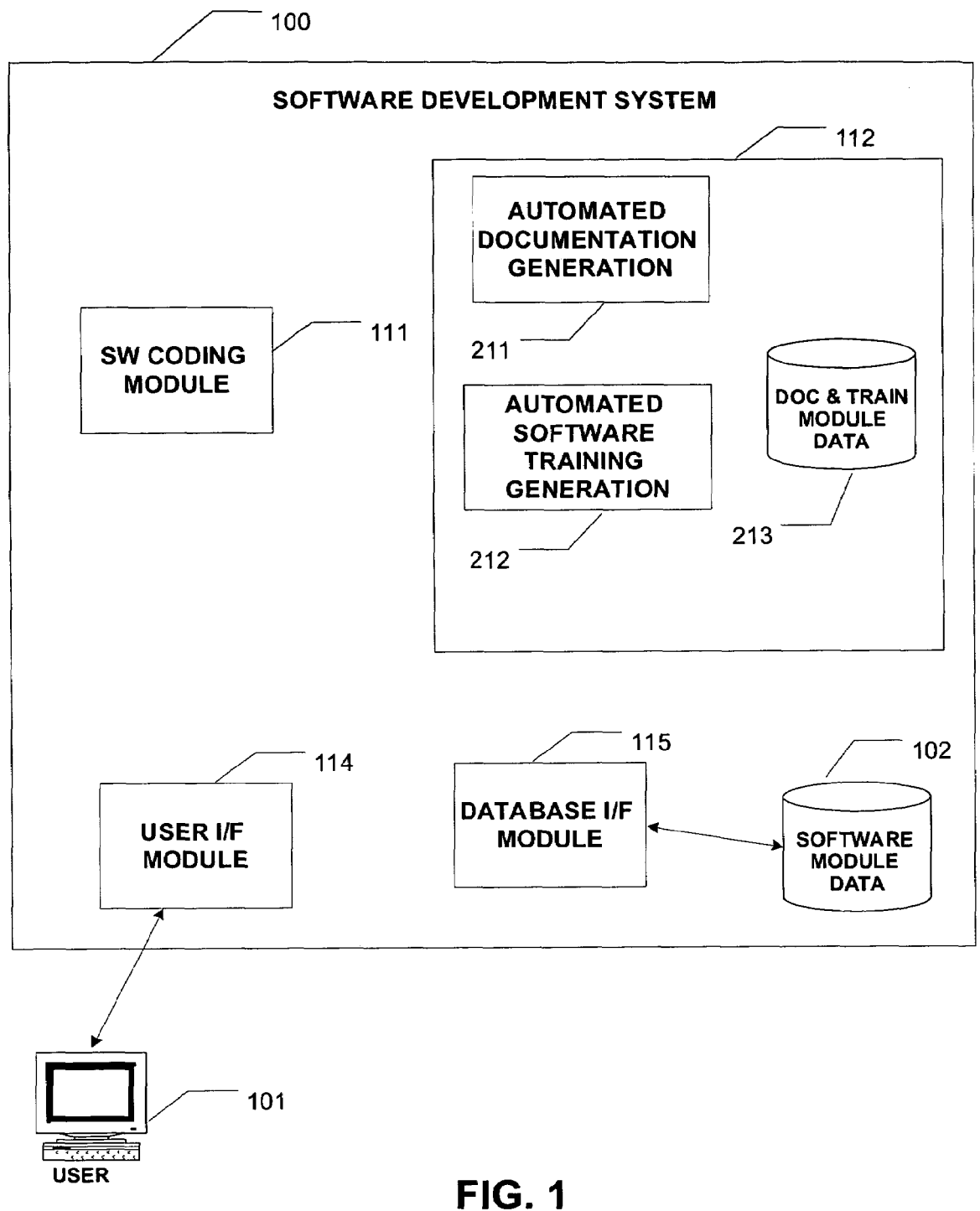
FIG. 1 is a block diagram depicting a system having a software development system in accordance with one example embodiment of the present invention.

FIG. 1 is a block diagram depicting a system having a software development system in accordance with one exemplary embodiment of the present invention. A software development system 100 is constructed using a set of processing modules to perform the development, maintenance and testing of applications and related processing modules. The set of processing modules may include in part a software coding module 111, a software documentation and training module 112, a user interface module 113, and a database interface module 114. Users 101 of system 100 communicate with the system through the user interface module 113 while performing all of the development and testing activities. Users 101 typically interact with the system 100 using a terminal or client computing system 101 that communicates with the system using a data transfer protocol. This communications may be a serial connection, a modem connection, a hard-wired connection and a network connection that permits user 101 to interact with system 100. User interface module 113 performs the processing functions necessary to permit the communications to occur over the connection between user 101 and system 100. While the example embodiment disclosed herein uses a client-server architecture, one skilled in the art will recognize that other architectures including a single processing system containing all of the processing modules as well as a distributed processing system having a collection of different processing systems for each of the processing functions may be utilized without departing from the present invention as recited within the attached claims.

Software coding module 111 generates the applications and related software modules that are part of the software development activities. These applications and software modules may include executable modules, source code, object code libraries and any other form of software modules used within the software development process. These modules may be stored within a software module database 102 that system 100 accesses using database interface module 114.

Software documentation and training module 112 automated generation of documentation and training materials for applications and related software modules during the software development process. This documentation and training generation process may utilize a set of test related modules that include an automated documentation generation module 211, an automated software training module 212, and a documentation and training data database 213. These modules operate together as part of the documentation and training generation process.

Figure 2:
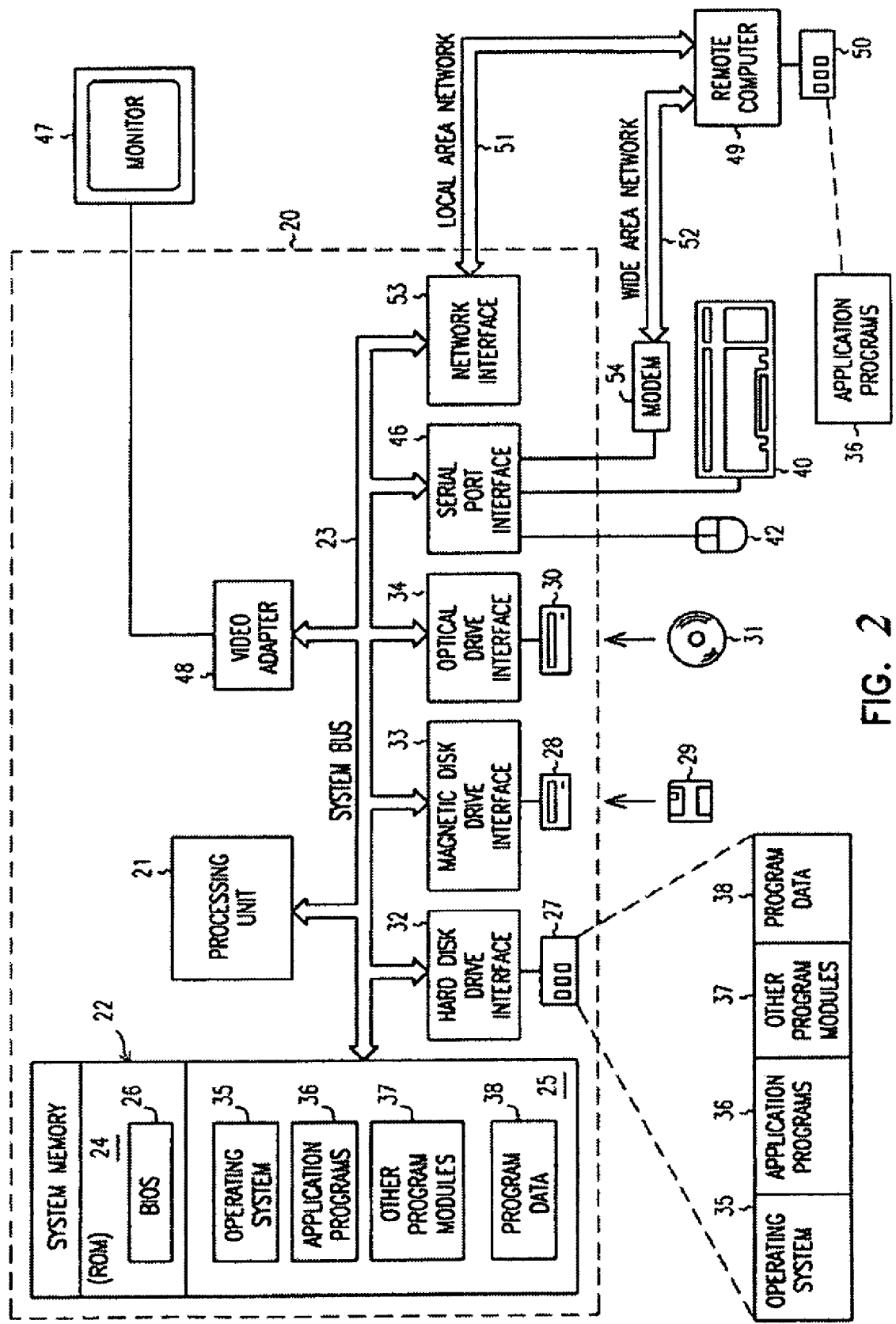
FIG. 2 is a block diagram illustrating a general programmable processing system for use in programmable processing system in accordance with various embodiments of the present invention.

FIG. 2 is an overview diagram of a hardware and operating environment in conjunction with which embodiments of the invention may be practiced. The description of FIG. 2 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

In the embodiment shown in FIG. 2, a hardware and operating environment is provided that is applicable to any of the servers and/or remote clients shown in the other Figures.

As shown in FIG. 2, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for the present invention can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 40 can display a graphical user interface for the user. In addition to the monitor 40, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above I/O relative to the computer 20, although only a memory storage device 50 has been illustrated. The logical connections depicted in FIG. 3 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

In the foregoing detailed description of embodiments of the invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the detailed description of embodiments of the invention, with each claim standing on its own as a separate embodiment. It is understood that the above description is intended to be illustrative, and not restrictive. It is intended to cover all alternatives, modifications and equivalents as may be included within the spirit and scope of the invention as defined in the appended claims. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

Figure 3:
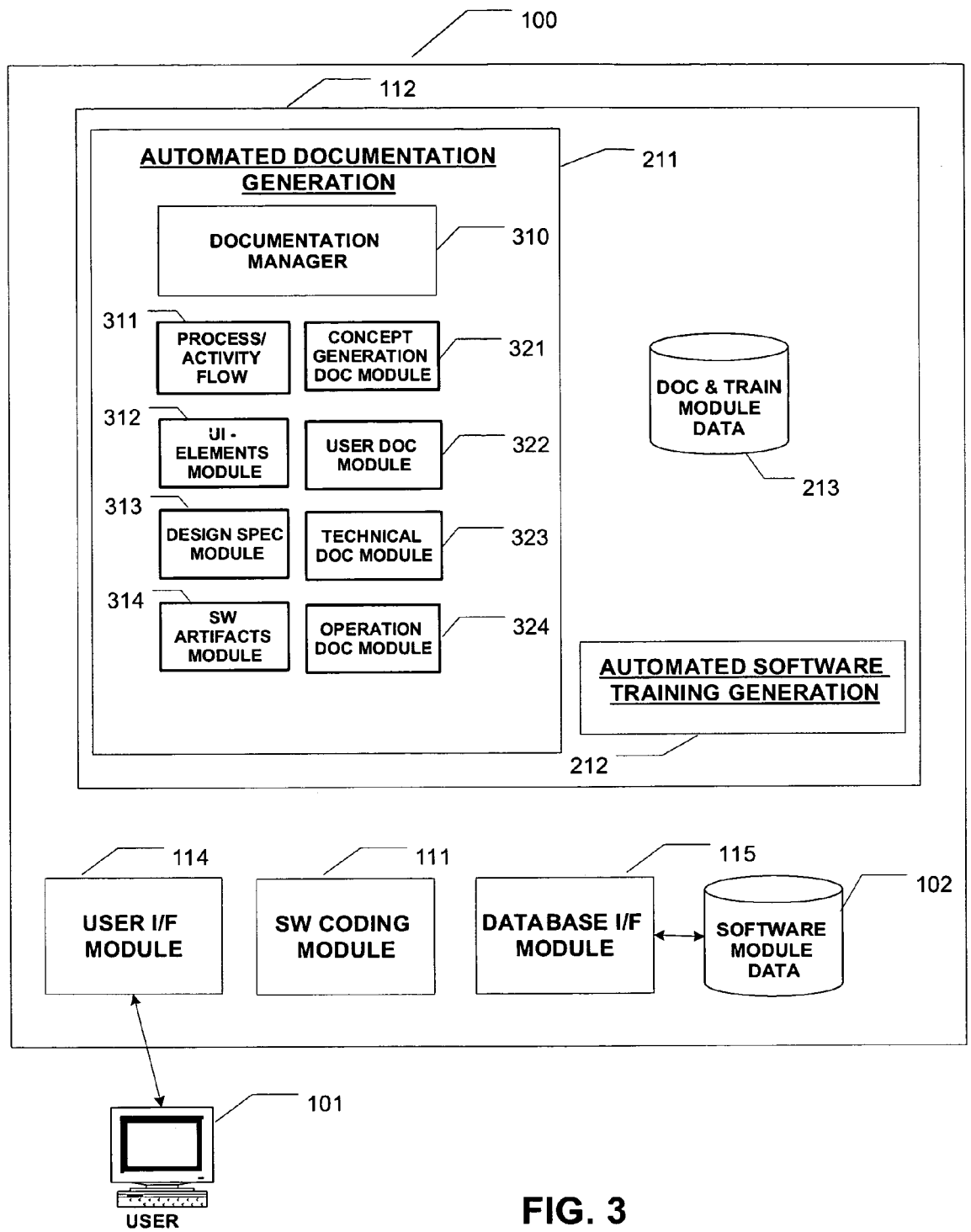
FIG. 3 is a block diagram depicting an automated documentation generation module within a software development system in accordance with one example embodiment of the present invention.

FIG. 3 is a block diagram depicting an automated documentation generation module within a software development system in accordance with one example embodiment of the present invention. The automated documentation generation module 211 includes a documentation manager module 310, a set of specification analysis modules 311-314 and a set of documentation generation modules 321-324. The set of specification analysis modules 311-314 include a process and activity flow analysis module 311, a user interface elements analysis module 312, a design specification analysis module 313, and a software artifact analysis module 314. The set of documentation generation modules 321-324 include a concept generation documentation module 321, user documentation module 322, technical documentation module 323, and operations documentation module 324. Data utilizes and generated by these modules are stored within the documentation and training data database 213 throughout the entire software development process.

In our approach, software specification structure drives the training and documentation effort. Software specifications hold the following structures: Process flow and activity flow specifications that describe the overall operational flow of the intended system may be processed by process and activity flow analysis module 311. User interfaces and the elements of the user interface including the navigational specifications across the user interfaces may be analyzed by user interface elements analysis module 312. Design specifications that are linked to the actions performed on the user interfaces may be processed by design specification analysis module 313. Software artifacts linked to the structure of specifications may be detected by software artifact analysis module 314.

With this knowledge repository as the backbone, additional information about each of the elements is recorded by the unit that works on the relevant area in software lifecycle explaining what, how, why and when aspects of the elements. As an example, business process analysts will describe the flow elements at the end of identification of process elements; requirements analysts will describe the user interfaces at the end of user interface design; technical designers will describe design elements used for implementation at the end of design specification; and deployment administrators will describe the various artifacts and the deployment map during software module implementation. All the documentation adornments are rooted to the various elements in the specification repository that provides the software structure.

When there are changes to the elements of documentation in the software structure during development or maintenance, impacted training and documentation artifacts will be identified to be updated with the changes in the descriptions used for documentation.

Documentation and training unit will use the descriptions and changes supplied by the relevant development units to update the final documentation. Documentation work can begin on various levels mentioned before when these stages are reached in the specification repository for the work products. Since change management is integrated, these activities may begin and run in parallel to the development activities through out the life cycle.

Figure 4:
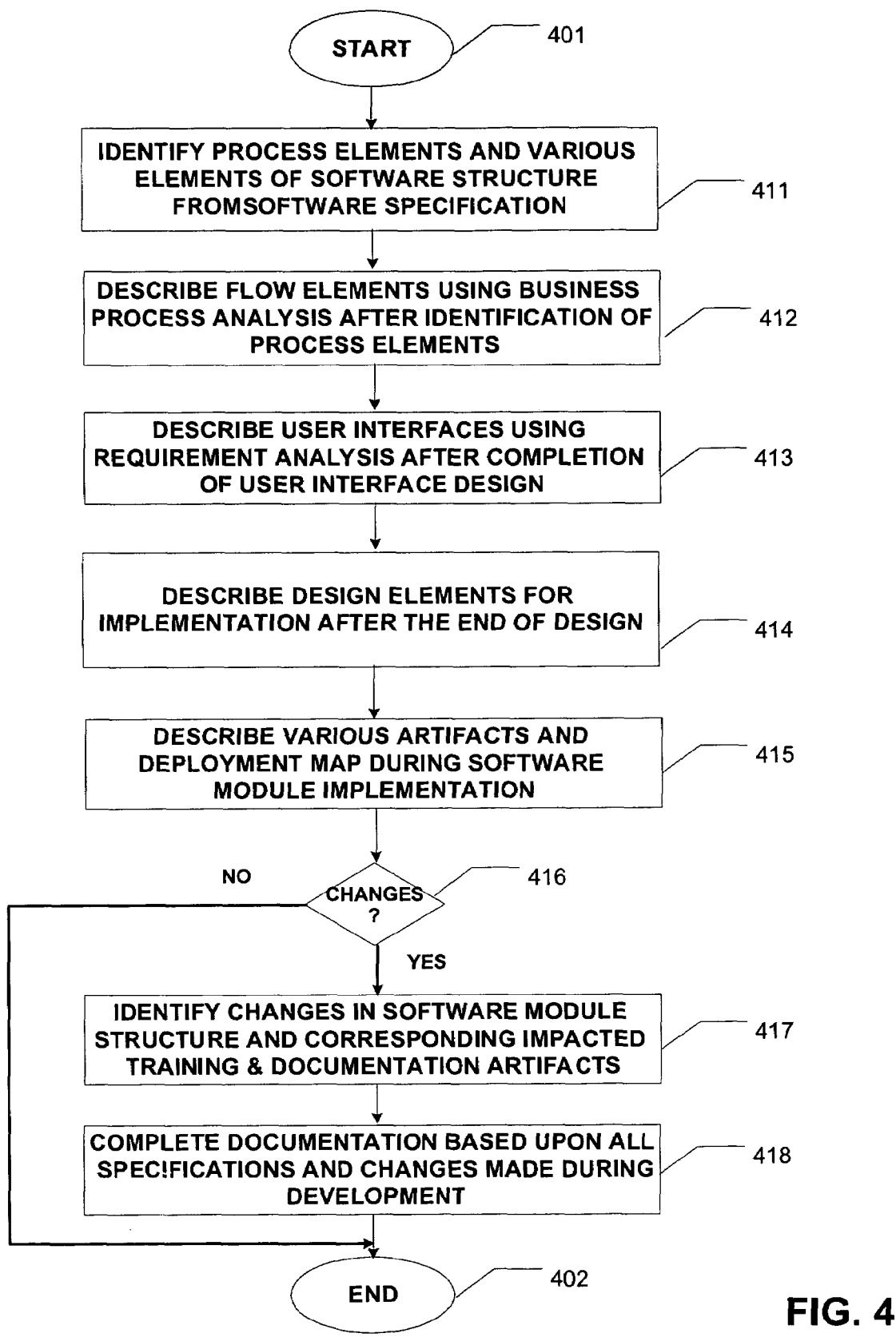
FIG. 4 a flowchart for an automated documentation generation module within a software development system in accordance with one example embodiment of the present invention.

FIG. 4 a flowchart for an automated documentation generation module within a software development system in accordance with one example embodiment of the present invention. The processing begins 401 and process elements and various elements of software structure from an application and its related modules are identified from software specification in module 411.

Next, process flow elements are described in module 412 using business process analysis after identification of all process elements has been completed. User interfaces are described in module 413 using requirements analysis after the completion of all user interface design processes. Design elements for implementation of the application and related modules is described in module 414 after the end of all module design has occurred. Finally, software artifacts and corresponding deployment map for the modules are described in module 415 during software module implementation.

Documentation may evolve during the development process as changes are made to the requirements and specification for an application and its supporting modules. If no changes have been made at a point on time, the documentation generation process ends 402. If test module 416 determines that changes have been made, processing continues to module 417 in which changes in software structure and corresponding impacted training and documentation artifacts are identified for updating. Documentation may be completed in module 418 based upon all specifications and changes made during implementation of the application and supporting software modules before the processing may end 402.

Figure 5:
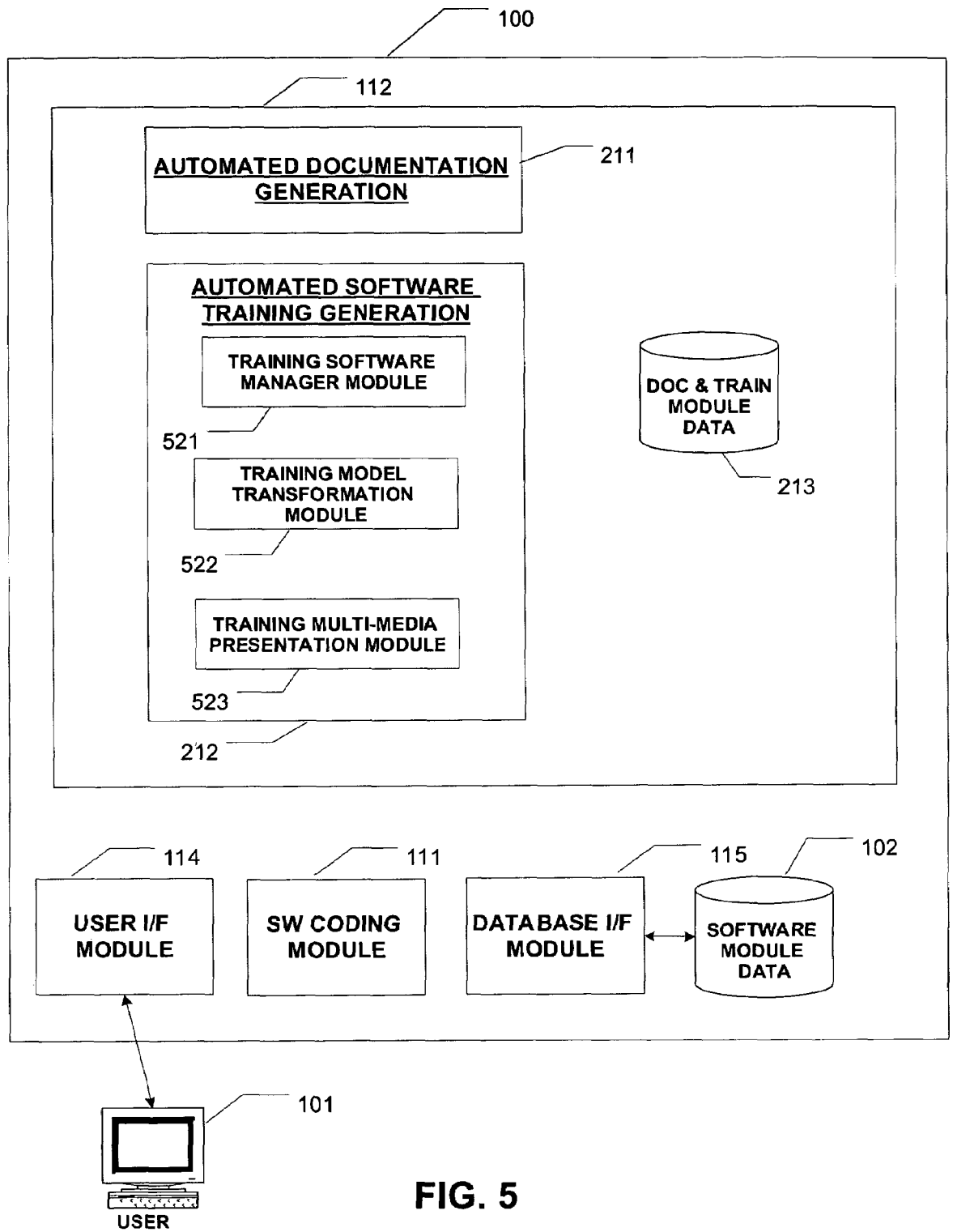
FIG. 5 is a block diagram depicting an automated software training generation module within a software development system in accordance with one example embodiment of the present invention.

FIG. 5 is a block diagram depicting an automated software training generation module within a software development system in accordance with one example embodiment of the present invention. The present invention is a software application that automates training on software applications. It makes available modular self-paced multi-media training units through the development of self-describing software components using model transformation techniques. The automated software training generation module 212 generates these training units using a training software manager module 521 that coordinates the operation of a training module transformation module 522 and a training multi-media presentation module 523.

Just as executable code can be generated through a series of model transformations from business requirements, the present invention generates self-paced instructional materials relating to a software application by transformation of software models. For example, the information held in the requirements model of a model-driven software application is mined and transformed into training modules for requirements engineers. The information thus generated is then rendered in a modular fashion for the user by the training module transformation module 522 to create units that assist users to learn the use of the complex software systems. The rendering of the instructional material is done using both textual and vector-driven graphical tools by the training multi-media presentation module 523. In essence, another software application is generated whose exclusive purpose is the description of the software application for which training is required. Thus, this invention, by making software programs self-elucidating, automates the process of automated software training of users.

The present invention trains a user on a particular software application by making visible, tangible, and explicit all navigable pathways in the targeted application. It provides a traversable cognitive map of the target software application. The present invention makes evident in a structured manner potential ways in which a software application might be used. The present invention models use of a software application as a process and then generates the training application as shown in FIG. 6.

Figure 6:
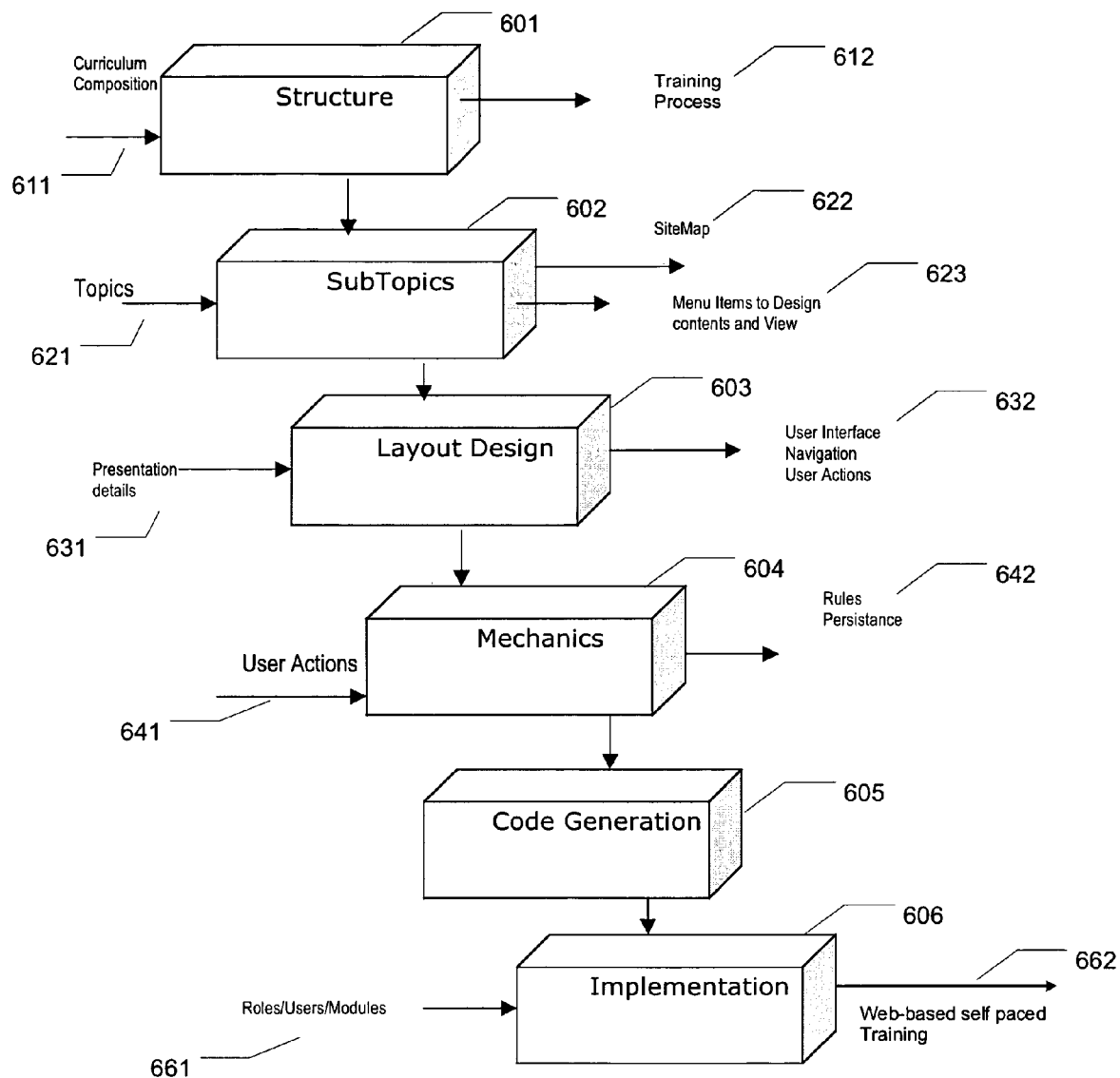
FIG. 6 a flowchart for an automated software documentation and training software in accordance with one example embodiment of the present invention.

FIG. 6 a flowchart for an automated software documentation and training software in accordance with one example embodiment of the present invention. The process of training material generation may be viewed as following a hierarchical process flow that begins with an analysis of the structure 601 of an application and its related software modules and ends with the generation of the detailed implementation of the training software modules 606. Between these two processing steps, analysis of subtopics 602, layout design 603, software module mechanics 604, and code generation 605 occurs in a hierarchical order.

When the structure 601 of an application is analyzed, curriculum and composition of training material 611 that is to be included within the training material is processed. From all of this analysis, an outline for a training process 612 to be generated is defined. This outline provides the overall framework for the training material generated.

Using this overall framework, subtopics 602 are generated from a set of general topics 621 that are to be covered when the training material is completed. The analysis and generation of subtopics 602 results in generation of a sitemap 622 and a set of menu items 623 that define the design contents and views to be covered by the training materials generated.

From the sitemap 622 and a set of menu items 623 and the subtopics 602, layout design 603 for the training materials may be processed. This analysis process accepts specification for presentation details 631 that are to be included within completed training materials. The analysis also generated a set of user interface elements, navigation definitions and user actions 632 to be supported by the training materials.

The user interface elements, navigation definitions and user actions 632 are then used in an analysis of the mechanics 604 of the application and its modules that uses definitions of user actions 641. From the processing, operating rules and persistence rules 642 are specified. These are used in defining the training materials and its operation.

All of the preceding material is utilized in code generation 605 that creates the training materials and its multi-media components. The generated code 605 is used in creating a final implementation 606 of the training materials using definitions of roles, users and modules 661. The final set of training materials 662, typically in the form of multi-media applications as well as supporting documents, is generated from the processing of these software modules.

Thus, a method and system for providing documentation and training in a software development activity within a software development system have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. An automated system for generating software documentation and training materials in a software development activity, the system comprising:
    a processing unit;
    memory coupled to the processing unit, wherein the memory comprises:
        a software development system, wherein the software development system comprises:
            a software coding module to generate applications and related software modules that are part of software development activity;
            a user interface module to communicate with the software development system; and
            a testing module for providing an integrated testing environment, the testing module comprising:
                an automated documentation generation module for generating documentation for an application and related software modules; and
                an automated software training generation module for generating user training materials for an application and related software modules, wherein the automated documentation generation module and the automated software training generation module utilize software specification structure defining the application and related software modules, and wherein the software specification structure includes process flow and activity flow specifications, user interface specifications, design specifications, and software artifacts linked to software specification structure.

2. The system according to claim 1, wherein the testing module further comprises:
    a documentation manager module; and
    a documentation and training data database.

3. The system according to claim 1, wherein the automated documentation generation module comprises:
    a set of specification analysis modules for processing software specification structure defining the application and related software modules: and
    a set of documentation generation modules for generating documentation of the application and related software modules.

4. The system according to claim 3, wherein the set of specification analysis modules comprises one or more modules selected from a set of modules comprising a process and activity flow analysis module, a user interface elements analysis module, a design specification analysis module, and a software artifact analysis module.

5. The system according to claim 3, wherein the automated software training generation module comprises one or more modules selected from a set of modules comprising a concept generation documentation module, user documentation module, technical documentation module, and operations documentation module.

6. The system according to claim 1, wherein the automated software training generation module comprises:
    a training software manager module;
    a training module transformation module; and
    a training multi-media presentation module.

7. The system according to claim 3, wherein the automated software training generation module generates set of training materials in the form of multi-media applications as well as supporting documents from the software specification structure defining the application and related software modules.

8. An automated method for generating software documentation and training materials within a software development activity, the method comprising:
    identifying process elements and associated elements of software specification structure from an application and its related modules by a process and activity flow analysis module and rooting the identified elements to the flow and activity flow specification in a specification repository that provides the software specification structure, wherein said software specification structure includes process flow and activity flow specifications, user interface specifications, design specifications, and software artifacts linked to software specification structure;
    describing user interfaces of software specification structure using requirements analysis after the completion of all user interface design processes and rooting the described user interfaces to the user interface specification in the specification repository that provides the software specification structure;
    describing design elements of software specification structure for implementation of the application and related modules after the end of all module design has occurred and rooting the described design elements to the design specification in the specification repository that provides the software specification structure;
    describing software artifacts and corresponding deployment map for the application and related modules during software module implementation and rooting the described artifacts to the software artifacts linked to software specification structure in the specification repository that provides the software specification structure; and
    generating documentation and training materials of software specification structure using the identified process elements, the user interfaces, the design elements, and the software artifacts.

9. The method according to claim 8, wherein the method further comprises:
    if changes have been made to the requirements and specification for the application and its supporting modules, then identifying changes in software module structure and corresponding impacted training and documentation artifacts; and
    completing documentation and training materials based upon all specifications and changes made during implementation of the application and supporting software modules.

10. The method according to claim 8, wherein the documentation for the application and its related software modules comprises:
- a concept generation documentation;
- user documentation;
- technical documentation; and
- operations documentation module.

11. The method according to claim 8, wherein the training materials for the application and its related software modules comprises a set of multi-media applications as well as supporting documents.

12. A machine-readable medium storing a set on instructions that, when executed by a machine, cause of the machine to perform an automated method for generating software documentation and training materials within a software development activity, the method comprising:
- identifying process elements and associated elements of software specification structure from an application and its related modules by a process and activity flow analysis module and rooting the identified elements to the flow and activity flow specification in a specification repository that provides the software specification structure, wherein said software specification structure includes process flow and activity flow specifications, user interface specifications, design specifications, and software artifacts linked to software specification structure;
- describing user interfaces of software specification structure using requirements analysis after the completion of all user interface design processes and rooting the described user interfaces to the user interface specification in the specification repository that provides the software specification structure;
- describing design elements of software specification structure for implementation of the application and related modules after the end of all module design has occurred and rooting the described design elements to the design specification in the specification repository that provides the software specification structure;
- describing software artifacts and corresponding deployment map for the application and related modules during software module implementation and rooting the described artifacts to the software artifacts linked to software specification structure in the specification repository that provides the software specification structure; and
- generating documentation and training materials of software specification structure using the identified process elements, the user interfaces, the design elements, and the software artifacts.

13. The machine-readable medium according to claim 12, wherein the method further comprises:
- if changes have been made to the requirements and specification for the application and its supporting modules, then identifying changes in software module structure and corresponding impacted training and documentation artifacts; and
- completing documentation and training materials based upon all specifications and changes made during implementation of the application and supporting software modules.

14. The machine-readable medium according to claim 12, wherein the documentation for the application and its related software modules comprises:
- a concept generation documentation;
- user documentation;
- technical documentation; and
- operations documentation module.

15. The machine-readable medium according to claim 12, wherein the training materials for the application and its related software modules comprises a set of multi-media applications as well as supporting documents.

* * * * *